United States Patent
Brombach et al.

(10) Patent No.: US 11,619,207 B2
(45) Date of Patent: Apr. 4, 2023

(54) DEFINED SWITCH POSITION IN A WIND FARM PRIOR TO FAILURE OF THE DC POWER SUPPLY

(71) Applicant: Wobben Properties GmbH, Aurich (DE)

(72) Inventors: Johannes Brombach, Berlin (DE); Tammo Fleßner, Moormerland (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/530,054

(22) Filed: Nov. 18, 2021

(65) Prior Publication Data
US 2022/0154692 A1    May 19, 2022

(30) Foreign Application Priority Data
Nov. 19, 2020 (EP) .................................... 20208744

(51) Int. Cl.
| | |
|---|---|
| *H02J 3/00* | (2006.01) |
| *F03D 7/02* | (2006.01) |
| *F03D 9/11* | (2016.01) |
| *F03D 7/04* | (2006.01) |
| *H02J 3/38* | (2006.01) |
| *H02J 3/40* | (2006.01) |

(52) U.S. Cl.
CPC .......... *F03D 7/0284* (2013.01); *F03D 7/048* (2013.01); *F03D 9/11* (2016.05); *H02J 3/0012* (2020.01); *H02J 3/381* (2013.01); *H02J 3/40* (2013.01); *F05B 2270/337* (2013.01); *H02J 2300/28* (2020.01)

(58) Field of Classification Search
CPC .......... F03D 7/0284; F03D 7/048; F03D 9/11; H02J 3/0012; H02J 3/381; H02J 3/40; H02J 2300/28; H02J 13/00004; H02J 3/001; F05B 2270/337; Y02E 70/30; Y02E 10/72; Y02E 10/76; Y02E 40/70; Y04S 10/123
USPC .......................................................... 307/84
See application file for complete search history.

(56) References Cited

U.S. PATENT DOCUMENTS

2020/0326383 A1* 10/2020 Armendariz Lekumberry ............ H02J 3/42
2021/0328429 A1   10/2021 Brombach

FOREIGN PATENT DOCUMENTS

| DE | 10 2018 125 445 A1 | 4/2020 |
|---|---|---|
| EP | 1 993 184 A1 | 11/2008 |
| WO | 2011/058170 A1 | 5/2011 |

* cited by examiner

*Primary Examiner* — Richard Tan
(74) *Attorney, Agent, or Firm* — Seed IP Law Group LLP

(57) ABSTRACT

A method for controlling a wind power installation or a wind farm is provided. The method includes establishing that there is a grid fault within an electrical power supply grid operated by a grid operator and to which the wind power installation or the wind farm is electrically connected via a point of common coupling; switching electrical switches of the wind power installation or the wind farm using a control unit of the wind power installation or the wind farm which is operated by a low-voltage power supply, so that the wind power installation or the wind farm is voltage-free; testing an electrical store for ensuring the low-voltage power supply once the grid fault has been established; and switching further electrical switches of the wind power installation or the wind farm to a predefined switching state in which start-up of the wind power installation or the wind farm is possible.

15 Claims, 3 Drawing Sheets

DEFINED SWITCH POSITION IN A WIND FARM PRIOR TO FAILURE OF THE DC POWER SUPPLY

BACKGROUND

Technical Field

The present invention relates to a method for controlling a wind power installation and/or a wind farm and to such a wind power installation and such a wind farm.

Description of the Related Art

A wind farm is generally connected to an electrical power supply grid via a point of common coupling and has a plurality of wind power installations which are connected to one another via a common electrical wind farm grid.

In the event of a grid faults within the electrical power supply grid, it may arise that the wind farm disconnects itself or needs to disconnect itself from the electrical power supply grid.

As a result, it may furthermore arise that the wind farm does not have any energy or has insufficient energy to start up (again), in particular by itself.

Such a wind farm can therefore also not contribute to a grid recovery of the electrical power supply grid.

BRIEF SUMMARY

One or more embodiments are directed to a method for a wind power installation or a wind farm with which it is possible to contribute to a grid recovery of an electrical power supply grid, in particular when a persistent grid failure was previously present.

Therefore, a method for controlling a wind power installation or a wind farm is proposed, comprising the following steps: establishing that there is a grid fault within an electrical power supply grid which is operated by a grid operator and to which the wind power installation or the wind farm is electrically connected via a point of common coupling; switching electrical switches of the wind power installation or the wind farm by means of a control unit of the wind power installation or the wind farm which is operated by a low-voltage power supply, so that the wind power installation or the wind farm is voltage-free; testing an electrical store for ensuring the low-voltage power supply once the grid fault within the electrical power supply grid has been established; switching further electrical switches of the wind power installation or the wind farm to a predefined switching state, in which start-up of the wind power installation or the wind farm is possible.

Therefore, in particular, a method is proposed with which a wind farm is brought into a protected switch position, which enables start-up of the wind farm after a grid failure.

In this case, the method is preferably implemented by a wind power installation control unit as described below or a wind farm control unit as described below.

In a first step of the method, it is established whether the electrical power supply grid has a grid fault, for example by means of a measurement unit (e.g., voltmeter, multimeter, voltage sensor, voltage detector or voltage tester) of the wind power installation or a measurement unit of the wind farm, which is designed in particular to detect a voltage of an electrical wind farm grid and/or of an electrical power supply grid.

Preferably, the grid fault within the electrical power supply grid is determined by means of a detection of the line voltage of the electrical power supply grid.

A grid fault is understood here to mean in particular all of those faults within an electrical power supply grid which, in particular in the short term, result in a substantial and/or persistent discrepancy between the line voltage and the rated line voltage. Accordingly, for example, there is a grid fault when the line voltage drops from 100 percent of the rated line voltage to 90 percent of the rated line voltage within one second.

In a further embodiment, a grid fault is understood to mean in particular a fault within the electrical power supply grid whereby the line voltage is below 10 percent of the rated line voltage, and the fault in particular is present for a relatively long period of time, for example for more than one minute. Such faults are also referred to as severe grid faults and generally result in grid failure.

In a particularly preferred embodiment, a grid fault is in particular understood to mean a grid failure in which the electrical power supply grid substantially no longer has a voltage, preferably for at least 30 minutes.

In a next step, at least one electrical switch of the wind power installation or the wind farm is switched, preferably by means of a control unit (e.g., controller) of the wind power installation or the wind farm, in such a way that the wind power installation or the wind farm is voltage-free. This means in particular that the wind power installation is disconnected from the electrical wind farm grid by means of a circuit breaker or that the wind farm is disconnected from the electrical power supply grid by means of a circuit breaker. The switching in this case takes place in particular in such a way that a power string of the wind power installation or the wind farm is switched so as to be voltage-free.

Voltage-free or deenergized should herein in particular be understood to mean that the power string of the wind power installation or the wind farm substantially no longer has a voltage. Nevertheless, the control and control engineering string, which comprises, for example, the communications, control and protection devices, can still have a running voltage, in particular in order to ensure the operational reliability of the wind power installation or the wind farm. A power string generally has several hundred volts, preferably more than 1 kilovolt (kV), and is used in particular for power transfer. A control and control engineering string generally has 12 volts (V) or 24 V or a few hundred volts, depending on the operating means, and is used in particular for information and data interchange.

In a further step, a test is performed to ascertain whether the electrical store/electrical storage device (e.g., battery or storage capacitor(s)) of the wind power installation or the wind farm, which is used for ensuring the low-voltage power supply, i.e., of the control and control engineering string, still has sufficient electrical energy, in particular to activate and implement, for example, a fault-case regulation and/or to start up the wind power installation or the wind farm again at a later point in time.

In particular, therefore, the state of charge of the electrical store of the control and control engineering string is tested, for example by means of the wind power installation control unit (e.g., wind power installation controller) or the wind farm control unit (e.g., wind farm controller).

As a result, the intention is in particular to prevent a deep discharge of the electrical store while the wind power installation or the wind farm is disconnected from the electrical power supply grid and in particular is not generating any electrical power. In the case of such a deep discharge of the electrical store, it may arise that the wind power installation or the wind farm can no longer be activated externally, for example by a grid operator. It would then therefore in particular no longer be possible for there to be any remote control of the wind power installation or the wind farm.

In a further step, further electrical switches of the wind power installation or the wind farm are then switched.

It is therefore proposed in particular to switch the further switches before the wind farm, in particular the electrical store, no longer has any energy.

In particular, the further switches are in this case switched to a predefined switching state, preferably in such a way that the wind power installation or the wind farm can be started up again at a later point in time.

In a further preferred embodiment, the predefined switching states are stored in the wind power installation control unit or the wind farm control unit, preferably as a function of a state of charge of the electrical store.

It is therefore in particular proposed to set the wind power installation or the wind farm, after a grid failure, to a state which makes it possible to start up the wind power installation or the wind farm again at a later point in time.

Therefore, a standby mode for wind power installations or wind farms is preferably proposed which is assumed by predefined switch positions, in particular of circuit breakers. An example of this is as follows: a wind farm having ten wind power installations which is disconnected from the electrical power supply grid after a grid failure, wherein eight of the ten wind power installations are additionally disconnected from the electrical wind farm grid so that now only two of the ten wind power installations of the wind farm are connected to one another via the electrical wind farm grid. These two wind power installations are then used to start up the wind farm again at a later point in time.

By means of such a procedure, it is in particular possible to start up a wind farm using remote control, even when the wind farm hardly has any more energy available for the start-up. Such a wind farm can then in particular contribute to a grid recovery.

Preferably, the grid fault is an, in particular persistent, failure of the electrical power supply grid.

The grid fault is therefore in particular a grid failure or a so-called blackout, and the method described above or below is used in particular for the recovery of an electrical power supply grid using a wind power installation or a wind farm.

The method described above or below is therefore in particular not a so-called low-voltage ridethrough (LVRT) method in which an attempt is made to ride through a voltage dip on the electrical power supply grid, in particular without disconnecting the wind power installation or the wind farm from the electrical power supply grid.

Preferably, the predefined switching state is preset by a grid operator of the electrical power supply grid.

The switching state is therefore in particular predefined or selected in such a way that requirements of a or the grid operator are satisfied thereby. For example, the grid operator prescribes specific requirements for the point of common coupling for the case of grid failure or of grid recovery which need to be met by means of the predefined switching state. Such requirements can be set, for example, by the grid operator by means of a grid protection concept.

Preferably, after switching of the further electrical switches, the wind power installation or the wind farm has an, in particular safe, operating state in which at least one function from the following list can be executed, said list consisting of:
  start-up of the wind power installation or the wind farm using auxiliary services;
  operation of the wind power installation or the wind farm using auxiliary services;
  switching of decoupling apparatuses of the wind power installation or the wind farm;
  synchronization of the wind power installation or the wind farm with the electrical power supply grid.

With the auxiliary services, in particular electrical energy is supplied to the low voltage, in particular in such a way that any communications, control and protection devices of the wind power installation or the wind farm are supplied current or are kept operationally ready.

In addition, the decoupling apparatus is in this case in particular embodied as a circuit breaker and is designed to disconnect the wind power installation or the wind farm from an electrical wind farm grid or an electrical power supply grid.

Preferably, the switching of the further electrical switches of the wind power installation or the wind farm to a predefined switching state takes place only once a grid operator has been informed of the fact that the further electrical switches should be switched.

It is therefore in particular also proposed that the wind power installation or wind farm only assumes the predefined switching state with the approval of the grid operator.

The wind power installation or the wind farm therefore preferably signals to a grid operator that the predefined switching state should be assumed, and the grid operator confirms this.

By means of such a procedure, the grid operator is enabled a better overview of the generating units (e.g., wind power installations or wind farms) in its electrical power supply grid during a grid fault.

As an alternative or in addition, it is proposed that the detected or established grid fault is verified with the grid operator of the electrical power supply grid.

If, therefore, the wind power installation or the wind farm establishes that there is a grid fault, in particular a grid failure, this is verified with the grid operator, for example by means of a signal line between the wind power installation control unit or the wind farm control unit and the grid operator.

The grid operator then verifies to the wind power installation or the wind farm that the established grid fault is a fault or else, for example, an intentional grid shutdown, which in particular is not a grid fault.

Preferably, the method further comprises the following step: transmitting an item of status information to a grid operator of the electrical power supply grid to the effect that the further switches of the wind power installation or the wind farm have been switched.

It is therefore in particular proposed to inform the grid operator of the fact that the further switches have been switched or that the wind power installation or the wind farm has assumed the predefined switching state.

This can also take place within the signal for fault-case regulation. If the grid operator transmits, for example, the signal "fault-case regulation," the wind farm can assume that the grid fault has been verified. Conversely, the fault-case regulation signaled back to the grid operator can indicate that the defined switch position has also been switched on.

Preferably, the method also comprises the following step: activating a fault-case regulation of the wind power installation or the wind farm in which safe operation of the wind power installation or wind farm is enabled despite the grid fault.

Preferably, the fault-case regulation comprises at least one of the following functions:
- a function which enables connection of a bus coupler at a point of connection of the wind power installation or the wind farm;
- a function which enables transmission of an item of status information to a grid operator, in particular before the electrical store has been discharged;
- a function which enables transmission of an item of status information to a grid operator, in particular once the predefined switching state has been assumed or produced;
- a function which enables checking of a grid state, in particular in order to be able to differentiate between a grid fault and a grid shutdown;
- a function which prevents or suppresses a start-up of one or all of the wind power installations or the wind farm;
- a function which enables switching of an on-load tap changer of a transformer, in particular the transformer at the point of connection;
- a function which activates a set of parameters for the control unit which enables operation of the wind power installation or the wind farm during a grid failure.

Preferably, the method further comprises the following step: DC-isolating the wind power installation or the wind farm from the electrical power supply grid by means of a decoupling apparatus, in particular in order to deenergize the wind power installation or the wind farm.

The DC-isolation can take place, for example, by means of a decoupling apparatus in the form of a circuit breaker in the form of a bus coupler, which is preferably arranged in the, in particular electrical, vicinity of a transformer, for example a wind farm transformer.

In addition a wind power installation having a low-voltage power supply is proposed which has an electrical store and a wind power installation control unit, which is designed to implement a method as described above or below.

Preferably, the wind power installation is embodied as described above or below.

The wind power installation in this case comprises at least one wind power installation control unit as described above or below which is operated on a low-voltage power supply.

The wind power installation therefore has at least a low voltage of, for example, less than 1 kV, by means of which any communications, control and protection devices of the wind power installation are supplied with power.

In particular, the wind power installation is a wind power installation of a wind farm as described above or below, and the wind power installation control unit is preferably designed to communicate with a wind farm control unit as described above or below, for example via a signal line.

In a preferred embodiment, the wind power installation control unit has a measurement unit as described above or below, which is designed to detect a voltage of an electrical wind farm grid and/or of an electrical power supply grid.

In addition a wind farm having a low-voltage power supply is proposed which has an electrical store and a wind farm control unit, which is designed to implement a method as described above or below.

The wind farm is preferably connected to an electrical power supply grid via a point of common coupling and has a multiplicity of wind power installations, which are connected to one another via a common electrical wind farm grid.

Preferably, the wind farm comprises a plurality of wind power installations, as described above or below.

Particularly preferably, the wind farm is controlled by means of a wind farm control unit as described above or below.

In addition, the wind farm comprises at least one wind power installation control unit as described above or below which is operated on a low-voltage power supply.

The wind farm therefore has at least a low voltage of, for example, less than 1 kV, by means of which any communications, control and protection devices of the wind farm are supplied with power.

Preferably, the low voltages of the individual wind power installations of the wind farm are also connected to this low voltage.

In a preferred embodiment, the wind farm control unit has a measurement unit as described above or below, which is designed to detect a voltage of an electrical wind farm grid and/or of an electrical power supply grid.

In a further preferred embodiment, the wind farm control unit or the wind power installation control unit has at least one function from the following list:
- a function which enables connection of a bus coupler at a point of connection of the wind power installation or the wind farm;
- a function which enables transmission of an item of status information to a grid operator, in particular before the electrical store has been discharged;
- a function which enables transmission of an item of status information to a grid operator, in particular once the predefined switching state has been assumed or produced;
- a function which enables checking of a grid state, in particular in order to be able to differentiate between a grid fault and a grid shutdown;
- a function which prevents or suppresses a start-up of one or all of the wind power installations or the wind farm;
- a function which triggers an operating mode: fault-case regulation, in which the wind power installation or the wind farm can be operated in a protected mode even when there is a grid fault, in particular grid failure, present or in which the wind power installation or the wind farm can execute a black start or can contribute to a grid recovery;
- a function which enables switching of an on-load tap changer of a transformer, in particular the transformer at the point of connection;
- a function which activates a set of parameters for the control unit which enables operation of the wind power installation or the wind farm during a grid failure.

Further functions are also conceivable which increase the operational reliability of the wind power installation or the wind farm during a failure of the electrical power supply grid.

The electrical store described herein in this case has in particular the task of functioning as an uninterruptible power supply (UPS), which supplies current to any communications, control and protection devices of the wind power installation or wind farm even when the wind power installation or the wind farm is not generating any electrical power because the electrical power supply grid has failed, for example.

BRIEF DESCRIPTION OF THE SEVERAL VIEWS OF THE DRAWINGS

The present invention will now be explained in more detail below by way of example using exemplary embodiments with reference to the attached figures, wherein the same reference symbols are used for identical or similar assemblies.

DETAILED DESCRIPTION

Figure 1:
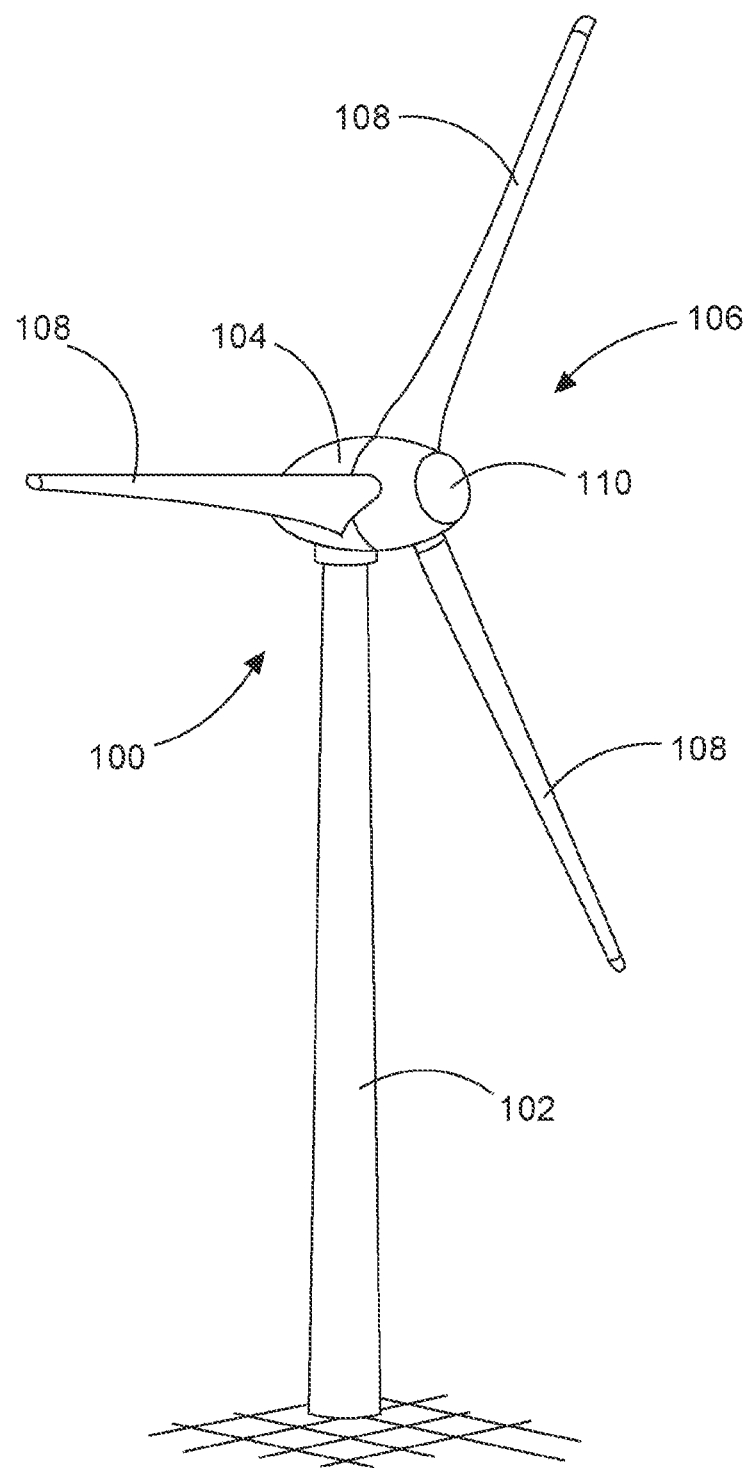
FIG. 1 shows a schematic view of a wind power installation in accordance with one embodiment.

FIG. 1 shows a schematic view of a wind power installation 100 in accordance with one embodiment.

The wind power installation 100 has, for this purpose, a tower 102 and a nacelle 104. An aerodynamic rotor 106 having three rotor blades 108 and a spinner 110 is arranged on the nacelle 104. The rotor 106, during operation, is set in rotary motion by the wind and thereby drives a generator in the nacelle 104.

In addition, the wind power installation 100 has a wind power installation control unit as described above or below which is connected to a wind farm control unit, in particular as described above or below, and/or a grid operator.

Figure 2:
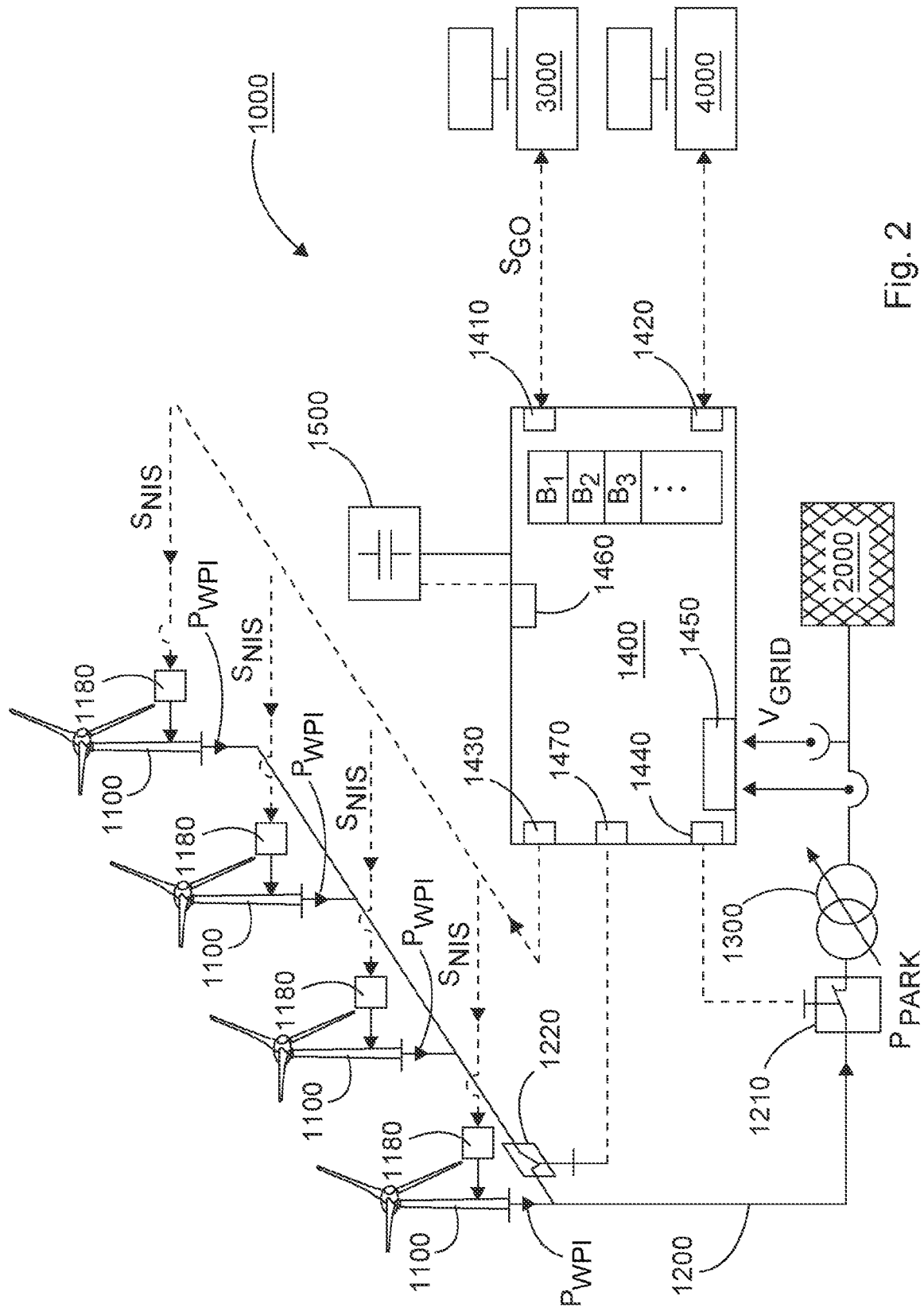
FIG. 2 shows a schematic view of a wind farm in accordance with one embodiment.

FIG. 2 shows a schematic design of a wind farm 1000 in accordance with one embodiment.

The wind farm 1000 comprises a plurality of wind power installations 1100, as shown, by way of example, in FIG. 1, which are connected to one another via a common wind farm grid 1200.

The wind farm grid 1200 has one or more switches (of which switch 1210 is shown in FIG. 2), in particular a bus coupler for the wind farm, and one or more further switches which further switch 1220 is shown in FIG. 2) and is connected to an electrical power supply grid 2000 by means of a wind farm transformer 1300 in order to inject, for example, an electrical wind farm power $P_{farm}$ which comprises a sum of the individual electrical wind power installation powers $P_{wpi}$.

The wind power installation 1100 and the wind farm grid 1200 form, together with the wind farm transformer, the power string (solid lines), i.e., in particular those assemblies which are responsible for the transport of energy into the electrical power supply grid.

In addition, the wind farm 1000 has a wind farm control unit 1400, which is designed to control the wind farm 1000. For this purpose, the wind farm control unit (e.g., wind farm controller) 1400 is in particular connected to the wind power installation control units (e.g., wind power installation controllers) 1180 of the wind power installations 1100.

The wind farm 1000 therefore has, in addition to the power string (solid lines), also a control and control engineering string (dashed lines), which will be described below.

The wind farm control unit 1400 has a plurality of interfaces 1410, 1420, 1430, 1440, 1450, 1460 and a plurality of operating modes B1, B2, B3, such as, for example, a fault-case regulation, and is supplied energy by means of an electrical store (e.g., battery or storage capacitor(s)), in particular even when the wind farm is not generating any electrical power and/or the electrical power supply grid has a grid fault or has failed.

The interface 1410 is designed to transmit signals to a grid operator 3000 or to receive signals from said grid operator. This interface 1410 can also be referred to as grid operator interface.

The interface 1420 is, for example, an interface for the installation operator 4000, which can likewise gain access to the wind farm via this interface 1420. This interface 1420 can also be referred to as wind farm operator interface 1420.

The driving of the individual wind power installations 1100 of the wind farm 1000 takes place via a control interface 1430, which is connected to the individual wind power installation control units 1180, for example by means of various control signals $S_{NIS}$.

By means of the interface 1440, the wind farm control unit can disconnect the wind farm from the electrical power supply grid by means of the switch 1210. This interface 1440 can also be referred to as disconnection interface.

By means of the interface 1450, the wind farm control unit can detect the injection (feed-in) by the wind farm and/or a voltage $V_{grid}$ on the electrical power supply grid 2000. This interface 1450 can also be referred to as measurement interface.

By means of the interface 1460, the wind farm control unit can monitor the state of the electrical store 1500. This interface 1460 can also be referred to as monitoring interface.

By means of the interface 1470, the wind farm control unit can switch a further switch 1220, in particular in such a way that the wind farm has a predefined switching state. This interface can also be referred to as switching interface.

Figure 3:
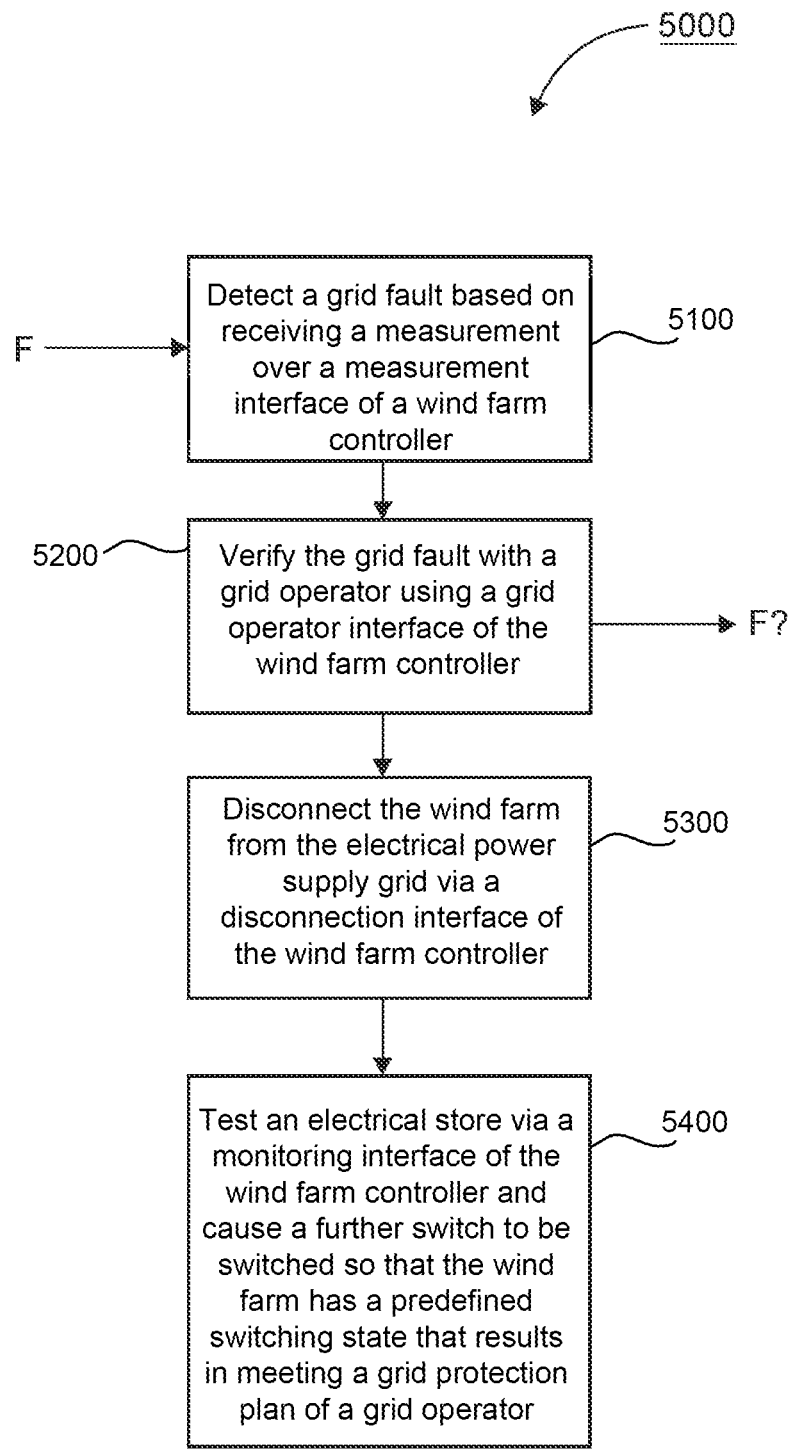
FIG. 3 shows a schematic flowchart of a method for controlling a wind farm in accordance with one embodiment.

FIG. 3 shows a schematic flowchart 5000 of a method for controlling a wind farm in accordance with one embodiment.

In a first step 5100, a grid fault is established, for example via a measurement interface of a wind farm control unit, as shown in FIG. 2.

In a next step 5200, the grid fault is verified with a grid operator, for example via a grid operator interface, as shown in FIG. 2.

Depending on the grid operator, however, a grid fault can also be assumed once a certain time has elapsed.

In a next step 5300, the wind farm is disconnected from the electrical power supply grid, for example via a disconnection interface by means of a switch, as shown in FIG. 2.

In a next step 5400, the electrical store is tested, for example via a monitoring interface, as shown in FIG. 2, and a further switch switched so that the wind farm has a predefined switching state, in particular in such a way that a grid protection plan of a grid operator is met.

LIST OF REFERENCE SYMBOLS 100 wind power installation
102 tower, in particular of wind power installation
104 nacelle, in particular of wind power installation
106 aerodynamic rotor, in particular of wind power installation
108 rotor blade, in particular of wind power installation
110 spinner, in particular of wind power installation
1000 wind farm
1100 wind power installation, in particular of wind farm
1200 wind farm grid, in particular of wind farm
1210 switch, in particular bus coupler, in particular of wind farm grid
1220 further switch, in particular of wind farm grid
1300 wind farm transformer, in particular of wind farm
1400 wind farm control unit, in particular of wind farm 1410 grid operator interface, in particular of wind farm control unit
1420 wind farm operator interface, in particular of wind farm control unit
1430 control interface, in particular of wind farm control unit
1440 disconnection interface, in particular of wind farm control unit
1450 measurement interface, in particular of wind farm control unit
1460 monitoring interface, in particular of wind farm control unit
1470 switching interface, in particular of wind farm control unit
1500 electrical store, in particular of wind farm
$P_{farm}$ wind farm power
$P_{wpi}$ wind power installation powers
$S_{NIS}$ control signals, in particular of wind farm control unit
$V_{grid}$ voltage of electrical power supply grid The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a wind power installation or a wind farm, comprising:
   determining that a grid fault exists in an electrical power supply grid, wherein the electrical power supply grid is operated by a grid operator, and the wind power installation or the wind farm is electrically connected to the electrical power supply grid via a point of common coupling;
   switching, by a wind power installation controller or a wind farm controller, a first electrical switch of the wind power installation or the wind farm to cause the wind power installation or the wind farm to be voltage-free, wherein the wind power installation controller or the wind farm controller is operated by a low-voltage power supply;
   in response to determining that the grid fault exists in the electrical power supply grid, testing an electrical stage device to determine whether the low-voltage power supply is available; and
   switching a second electrical switch of the wind power installation or the wind farm to a predefined switching state in which start-up of the wind power installation or the wind farm is executable.

2. The method as claimed in claim 1, wherein:
   the wind power installation is voltage-free when the wind power installation is disconnected from an electrical wind farm grid by using the first electrical switch, wherein the first electrical switch is a first circuit breaker, or
   the wind farm is voltage-free when the wind farm is disconnected from the electrical power supply grid using the second electrical switch, wherein the second electrical switch is a second circuit breaker.

3. The method as claimed in claim 1, wherein the low-voltage power supply is less than one kilovolt (kV).

4. The method as claimed in claim 1, wherein the grid fault is a failure of the electrical power supply grid.

5. The method as claimed in claim 1, wherein the grid fault is a persistent failure of the electrical power supply grid.

6. The method as claimed in claim 1, wherein the predefined switching state is preset by the grid operator of the electrical power supply grid.

7. The method as claimed in claim 1, wherein after switching the second electrical switch, the wind power installation or the wind farm has an operating state in which at least one function is executable from a list of functions including:
   start-up of the wind power installation or the wind farm using auxiliary services;
   operation of the wind power installation or the wind farm using the auxiliary services;
   switching the first electrical switch or the second electrical switch, wherein the first electrical switch is a first circuit breaker or a first bus coupler, and wherein the second electrical switch is a second circuit breaker or a second bus coupler; and
   synchronization of the wind power installation or the wind farm with the electrical power supply grid.

8. The method as claimed in claim 1, wherein the switching of the second electrical switch of the wind power installation or the wind farm to the predefined switching state is performed after notifying the grid operator that the second electrical switch is to be switched.

9. The method as claimed in claim 1, comprising:
   verifying the grid fault with the grid operator of the electrical power supply grid.

10. The method as claimed in claim 1, comprising:
    transmitting status information, to the grid operator of the electrical power supply grid, indicating that the second electrical switch of the wind power installation or the wind farm has been switched.

11. The method as claimed in claim 1, comprising:
    activating a fault-case regulation of the wind power installation or the wind farm in which safe operation of the wind power installation or the wind farm is enabled despite the grid fault.

12. The method as claimed in claim 1, comprising:
    DC-isolating the wind power installation or the wind farm from the electrical power supply grid using the first electrical switch to deenergize the wind power installation or the wind farm, wherein the first electrical switch is a circuit breaker or a bus coupler.

13. A wind power installation or wind farm, comprising:
    an electrical storage device; and
    a controller configured to perform the method as claimed in claim 1.

14. The wind power installation or wind farm as claimed in claim 13, wherein the low-voltage power supply has a DC voltage.

15. The wind power installation or wind farm as claimed in claim 13, wherein the second electrical switch is a circuit breaker or a bus coupler, and wherein the second electrical switch is configured to connect the wind power installation or the wind farm to the electrical power supply grid at the point of common coupling.

\* \* \* \* \*